(12) United States Patent
Tang et al.

(10) Patent No.: US 12,066,671 B2
(45) Date of Patent: Aug. 20, 2024

(54) SEMICONDUCTOR DEVICES WITH VERTICALLY STACKED AND LATERALLY OFFSET INTERMEDIATE WAVEGUIDES

(71) Applicant: Taiwan Semiconductor Manufacturing Company, Ltd., Hsinchu (TW)

(72) Inventors: Cheng-Tse Tang, Hsinchu (TW); Chewn-Pu Jou, Hsinchu (TW); Chih-Wei Tseng, Hsinchu (TW); Hsing-Kuo Hsia, Jhubei (TW); Ming Yang Chung, Kaohsiung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 279 days.

(21) Appl. No.: 17/826,098

(22) Filed: May 26, 2022

(65) Prior Publication Data

US 2023/0221511 A1   Jul. 13, 2023

Related U.S. Application Data

(60) Provisional application No. 63/298,900, filed on Jan. 12, 2022.

(51) Int. Cl.
*G02B 6/42* (2006.01)
*G02B 6/43* (2006.01)

(52) U.S. Cl.
CPC ......... *G02B 6/4283* (2013.01); *G02B 6/4238* (2013.01); *G02B 6/43* (2013.01)

(58) Field of Classification Search
CPC ....... G02B 6/4283; G02B 6/4238; G02B 6/43
See application file for complete search history.

(56) References Cited

U.S. PATENT DOCUMENTS

| | | | |
|---|---|---|---|
| 9,099,581 B2 | 8/2015 | Na et al. | |
| 10,197,731 B2 | 2/2019 | Teng et al. | |
| (Continued) | | | |

FOREIGN PATENT DOCUMENTS

| | | |
|---|---|---|
| CN | 110741294 A | 1/2020 |
| JP | 4688248 B2 | 5/2011 |
| TW | 1707168 B | 10/2020 |

OTHER PUBLICATIONS

Taiwan Office Action issued in connection with TW Appl. Ser. No. 111132785 dated Mar. 3, 2023 (6 pages).

*Primary Examiner* — Andrew Jordan
(74) *Attorney, Agent, or Firm* — FOLEY & LARDNER LLP

(57) ABSTRACT

A semiconductor device includes a plurality of intermediate waveguides. The plurality of intermediate waveguides are vertically disposed on top of one another, and vertically adjacent ones of the plurality of intermediate waveguides are laterally offset from each other. When viewed from the top, each of the plurality of intermediate waveguides essentially consists of a first portion and a second portion, the first portion has a first varying width that increases from a first end of the corresponding intermediate waveguide to a middle of the corresponding intermediate waveguide, and the second portion has a second varying width that decreases from the middle of the corresponding intermediate waveguide to a second end of the corresponding intermediate waveguide.

20 Claims, 11 Drawing Sheets

(56) References Cited

U.S. PATENT DOCUMENTS

| | | | |
|---|---|---|---|
| 10,267,990 B1* | 4/2019 | Yu | H05K 1/181 |
| 10,649,140 B1 | 5/2020 | Bian et al. | |
| 10,677,991 B2 | 6/2020 | Novack et al. | |
| 10,678,007 B2 | 6/2020 | Van Campenhout et al. | |
| 10,684,527 B2 | 6/2020 | Watts et al. | |
| 11,086,193 B1* | 8/2021 | Chiles | G02F 1/37 |
| 11,309,688 B2* | 4/2022 | Ikeda | H01L 21/20 |
| 11,609,374 B2* | 3/2023 | Chen | G02B 6/12016 |
| 11,852,868 B2* | 12/2023 | Yu | G02B 6/12004 |
| 2016/0202432 A1* | 7/2016 | Chen | G02B 6/4227 |
| | | | 385/14 |
| 2017/0031113 A1* | 2/2017 | Chen | G02B 6/122 |
| 2017/0254951 A1* | 9/2017 | Dumais | G02B 6/12002 |
| 2018/0039026 A1* | 2/2018 | Novack | G02B 6/14 |
| 2019/0094468 A1* | 3/2019 | Novack | G02B 6/1228 |
| 2019/0162901 A1* | 5/2019 | Yu | H05K 1/112 |
| 2019/0245318 A1* | 8/2019 | LaComb | H01S 5/4043 |
| 2020/0003950 A1* | 1/2020 | Yu | G02B 6/124 |
| 2020/0026000 A1* | 1/2020 | Bian | G02B 6/107 |
| 2021/0018678 A1* | 1/2021 | Yu | G02B 6/125 |
| 2021/0088723 A1* | 3/2021 | Yu | G02B 6/1225 |
| 2021/0096311 A1* | 4/2021 | Yu | G02B 6/4274 |
| 2022/0043208 A1* | 2/2022 | Hsia | G02B 6/124 |
| 2022/0146749 A1* | 5/2022 | Bandyopadhyay | G02B 6/125 |
| 2022/0381985 A1* | 12/2022 | Hsia | G02B 6/12002 |
| 2022/0382003 A1* | 12/2022 | Yu | G02B 6/4206 |
| 2023/0012157 A1* | 1/2023 | Yu | G02B 6/12004 |
| 2023/0032684 A1* | 2/2023 | Go | G02B 6/125 |
| 2023/0161120 A1* | 5/2023 | Yu | G02B 6/4214 |
| | | | 385/14 |
| 2023/0221511 A1* | 7/2023 | Tang | G02B 6/125 |
| | | | 385/14 |
| 2023/0358950 A1* | 11/2023 | Yu | G02B 6/136 |
| 2023/0393336 A1* | 12/2023 | Hsia | G02B 6/124 |
| 2023/0395583 A1* | 12/2023 | Chern | H01L 24/08 |
| 2023/0400627 A1* | 12/2023 | Song | G02B 6/122 |
| 2023/0408769 A1* | 12/2023 | Kuo | G02B 6/4204 |
| 2023/0409894 A1* | 12/2023 | Song | G06N 3/067 |
| 2023/0417993 A1* | 12/2023 | Tsai | H01S 5/0239 |
| 2024/0045143 A1* | 2/2024 | Shih | G02B 6/1223 |

* cited by examiner

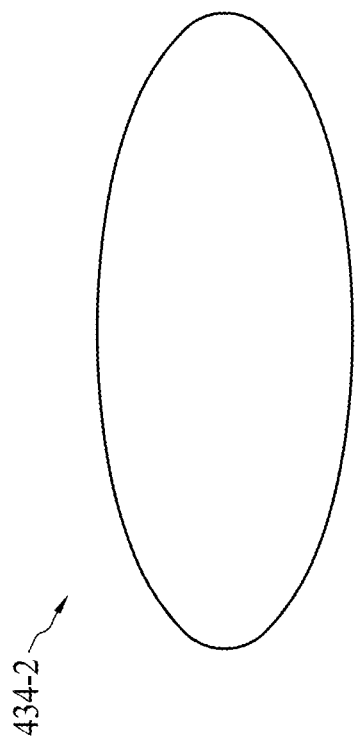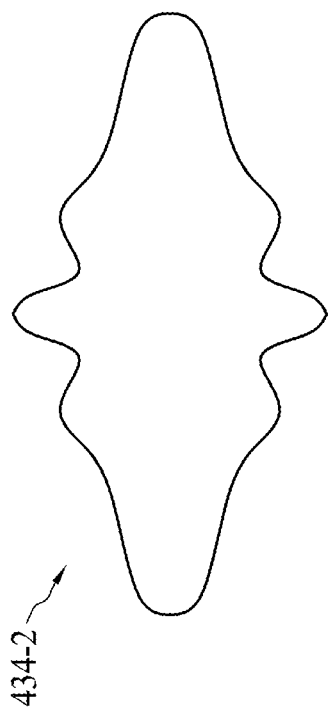
FIG. 9    FIG. 10
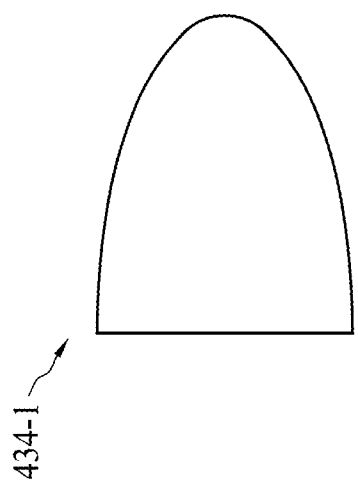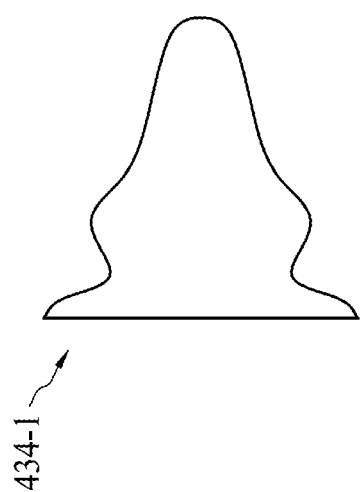

SEMICONDUCTOR DEVICES WITH VERTICALLY STACKED AND LATERALLY OFFSET INTERMEDIATE WAVEGUIDES

CROSS-REFERENCE TO RELATED APPLICATION

This application claims priority to and the benefit of U.S. Provisional Application No. 63/298,900, filed Jan. 12, 2022, entitled "SEMICONDUCTOR DEVICE WITH THROUGH CHIP OPTICAL VIA (TCOV)," which is incorporated herein by reference in its entirety for all purposes.

BACKGROUND

Electrical signaling and processing are one technique for signal transmission and processing. Optical signaling and processing have been used in increasingly more applications in recent years, particularly due to the use of optical fiber-related applications for signal transmission.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 9 and 10 each illustrate a top view of another profile of the waveguides of FIG. 5, in accordance with some embodiments.

DETAILED DESCRIPTION

Figure 1:
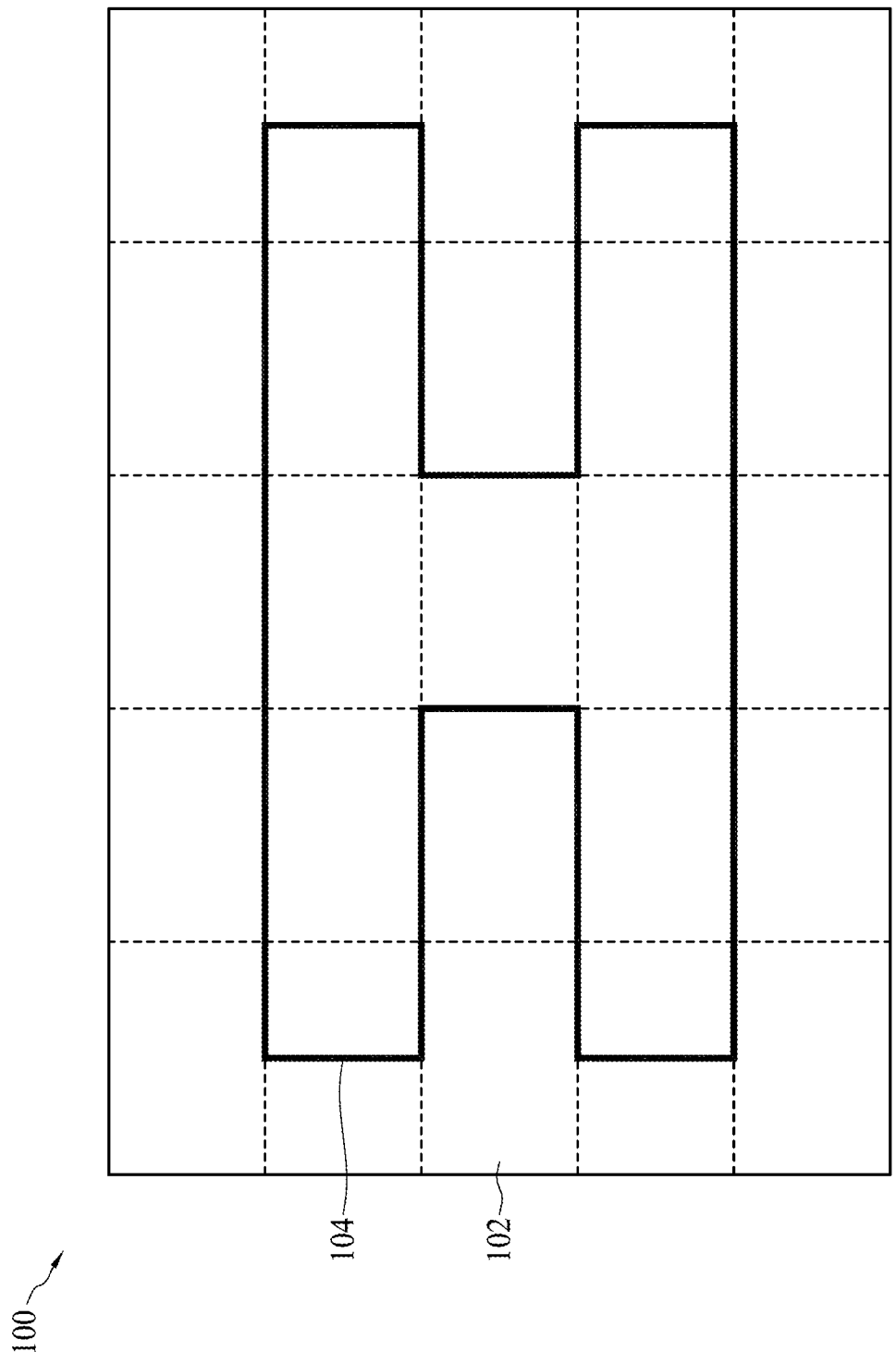
FIG. 1 illustrates a multi-chip system including a number of sites, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include a number of optical (or photonic) dies each having various optical devices, and a number of electronic dies each having various electronic devices.

In general, a photonic die includes a number of optical interconnect structures. The optical interconnect structure is configured to receive an optical signal (e.g., light), and direct or otherwise guide the optical signal via optical waveguides to one or more optical devices (e.g., photodetectors). In some scenarios, these optical waveguides may be formed in a single level. In consideration of saving a total area occupied by the corresponding photonic die, such optical waveguides may be formed (e.g., stacked) across multiple levels. When being stacked, each of the waveguides typically has a certain portion vertically overlapped with (a portion) of a neighboring waveguide. In existing techniques, each of the waveguides is generally formed as having a transitioning portion interposed between two tapered portions to assure the optical signal propagated therein can be saturated. Such a transitioning portion has a fixed width and is generally required to have a length not less than a half of the width. In this way, a footprint of these waveguides can occupy a relatively large amount of area, which may disadvantageously go against the intention to stack the waveguides. Thus, the existing photonic dies (or packages including the existing photonic dies) have not been entirely satisfactory in many aspects.

The present disclosure provides various embodiments of a package including a number of photonic dies and a number of electrical dies operatively (e.g., electrically and/or optically) coupled to each other, and the method of forming the same. In accordance with various embodiments, the package (or each of its included photonic dies), as disclosed herein, includes a number of waveguides vertically stacked on top of one another and at least some of these waveguides each essentially consist of a first tapered portion and a second tapered portion back-to-back connected to each other. For example, the first tapered portion has a monotonically increasing width from a first end to a middle of the corresponding waveguide, and the second tapered portion has a monotonically decreasing width from the middle to a second end of the waveguide. Stated another way, the disclosed waveguides include no transitioning portion interposed between the first and second tapered portions. In this way, a total footprint of each of the photonic dies can be significantly reduced. The waveguides can each have a certain portion laterally overlapped with (a portion) of a neighboring waveguide, which allows the waveguides disposed in different levels or in different dies (chips) to optically communicate with each other.

FIG. 1 illustrates a multi-chip system 100, in accordance with various embodiments. The multi-chip system 100 is, e.g., a high performance computing (HPC) system, and includes a plurality of sites 102, each of which may be a separate computing system. Each of the sites 102 may be formed as a (e.g., three-dimensional (3D)) semiconductor package, for example, formed on a common package substrate. Although the system 100 shown in FIG. 1 has twenty sites 102, it should be understood that the system 100 can include any number of sites 102 while remaining within the scope of present disclosure.

The sites 102 are interconnected by an optical pathway 104, which allows the separate computing systems of the sites 102 to communicate with each other. For example, the optical pathway 104 may be a closed loop (or ring) that connects to each site 102 of the multi-chip system 100. As such, each site 102 may communicate with any of the other sites 102 via the optical pathway 104. In an embodiment, the optical pathway 104 includes a plurality of waveguides, and each waveguide connects at least two of the sites 102 in a peer-to-peer manner. In some embodiments, the optical pathway 104 is a silicon photonic interconnect, although other types of optical pathways could be used.

Figure 2:
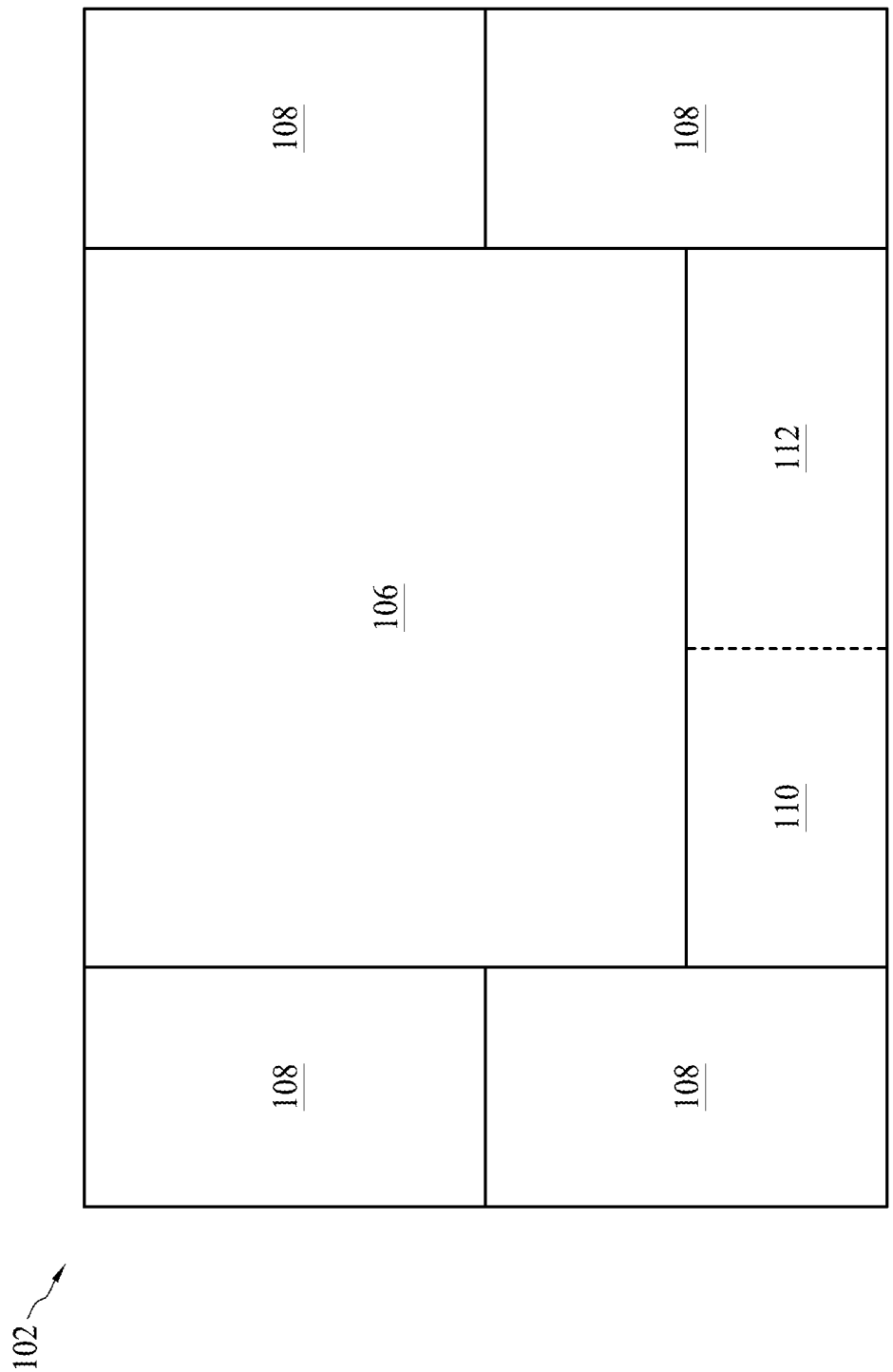
FIG. 2 illustrates an example arrangement of components of a site of the multi-chip system of FIG. 1, in accordance with some embodiments.

Referring to FIG. 2, an example layout or otherwise arrangement of components (e.g., dies, devices, etc.) in each site 102 is shown, in accordance with various embodiments. As a non-limiting example shown in FIG. 2, each site 102 may include a processor die 106, memory dies 108, an electronic die 110, and a photonic die 112. The optical pathway 104 extends under one or more components of each site 102, but at least extends under the photonic die 112 of each site 102. The sites 102 are interconnected by an electrical pathway (not shown in FIG. 1 or 2, but will be described below).

The processor die 106 may be a central processing unit (CPU), graphics processing unit (GPU), application-specific integrated circuit (ASIC), or the like. The memory dies 108 may be volatile memory such as dynamic random-access memory (DRAM), static random-access memory (SRAM), or the like. In the embodiment shown, each site 102 includes one processor die 106 and four memory dies 108, although it should be appreciated that each site 102 may include more or less memory dies 108.

The photonic die 112 can transmit, receive, convert, modulate, demodulate, or otherwise process optical signals. For example, the photonic die 112 can convert electrical signals from the processor die 106 to optical signals, and convert optical signals to electrical signals. The photonic die 112 can communicate such optical signals through the optical pathway 104 (FIG. 1) with one or more other photonic dies. The photonic die 112 can receive optical signals (e.g., from an optical fiber), and transmit and/or receive the optical signals via one or more waveguides of the optical pathway 104. According to various embodiments of the present disclosure, at least some of the waveguides are vertically stacked on top of one another, and laterally overlapped with neighboring waveguides. Further, when viewed from the top, each of these waveguides has a diamond-based shape constituted by a first tapered portion and a second tapered portion, and no laterally extending (or straight) portion is interposed between such tapered portions back-to-back connected to each other. Such optical signals may include a test signal configured to test the corresponding photonic die 112, the optical pathway 104, etc., and/or a carrier (e.g., laser) signal. Accordingly, the photonic die 112 is responsible for the input/output (I/O) of optical signals to/from the optical pathway 104. In some embodiments, the optical pathway 104, or at least a portion of it, may be integrated into the photonic die 112.

In various embodiments, the photonic die 112 may be a photonic integrated circuit (PIC), and the electronic die 110 includes electronic circuits needed to interface the processor die 106 with the photonic die 112. For example, the electronic die 110 may include controllers, transimpedance amplifiers, and the like. The electronic die 110 controls high-frequency signalling of the photonic die 112 according to electrical signals (digital or analog) received from the processor die 106. The electronic die 110 may be an electronic integrated circuit (EIC). Although the processor die 106, memory dies 108, and electronic die 110 are illustrated as being separate dies in the non-limiting example of FIG. 2, it should be appreciated that the sites 102 could each be a system-on-chip (SoC) or a system-on-integrated-circuit (SoIC) device/package. As such, the processing, memory, and/or electronic control functionality may be integrated on the same die or the same substrate.

Figure 3:
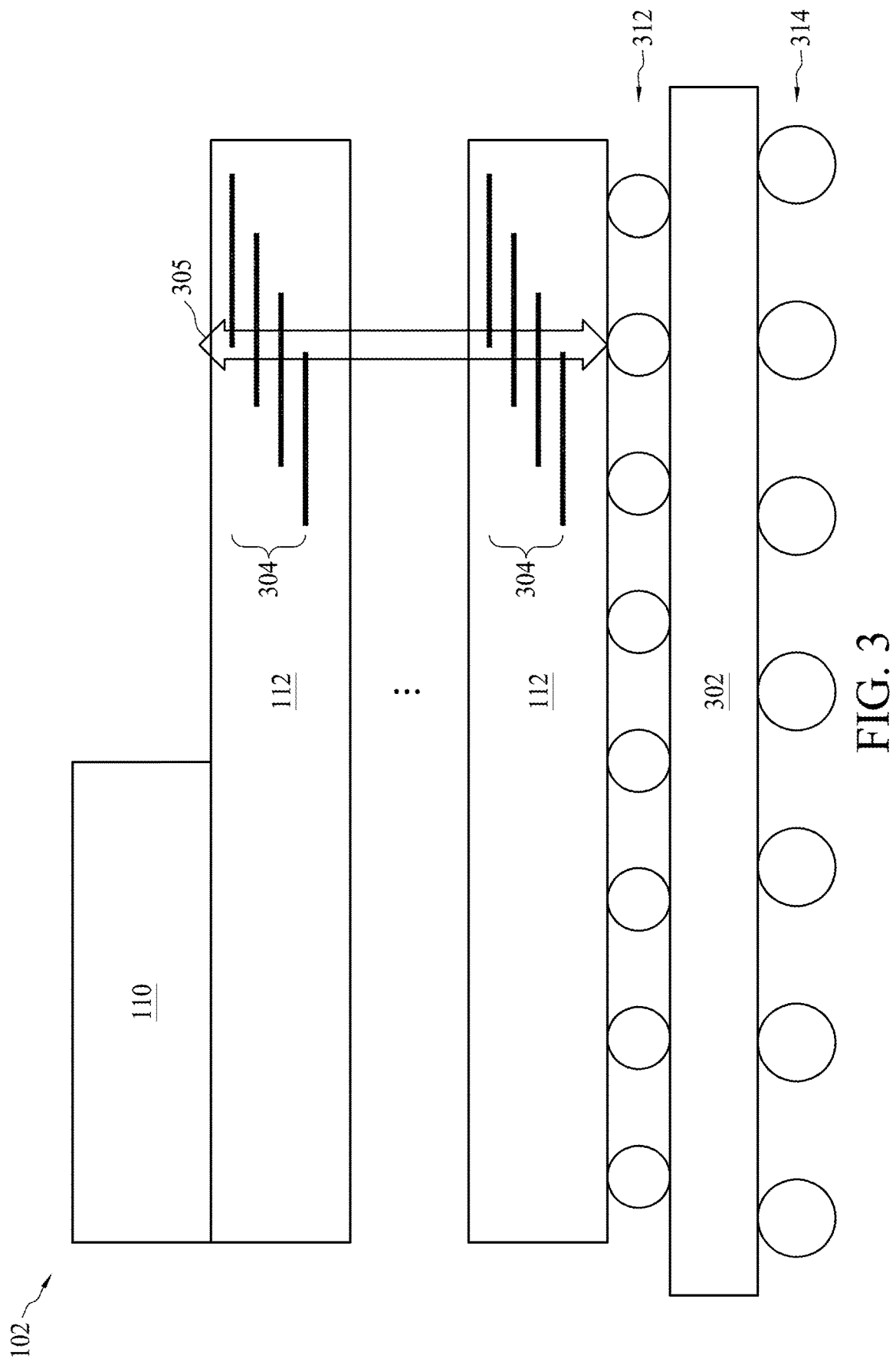
FIG. 3 illustrates a cross-sectional view of a portion of the site of FIG. 1, in accordance with some embodiments.

FIG. 3 illustrates a cross-sectional view of an example implementation of a portion of the site 102, in accordance with various embodiments. For example, the portion of the site 102 shown in FIG. 3 includes an electrical die 110 attached to or otherwise stacked over a number of photonic dies 112, and such two stacked dies are disposed over a package substrate 302. The cross-sectional view of the site 102, in FIG. 3, is simplified as a schematic diagram, while further details of the site 102 will be shown and discussed in the cross-sectional view of FIG. 4. Further, it should be appreciated that over the package substrate 302, the site 102 can include any of various other dies attached thereto, for example, one or more memory dies 108, one or more processor dies 106, etc., while remaining within the scope of present disclosure.

As shown, the photonic dies 112 are vertically stacked on top of one another. Each of the photonic dies 112 include a number of waveguides 304 disposed in an area of the corresponding photonic die. Such an area is free from any conductive (e.g., metal) feature, thereby forming an optical transmission path (e.g., 305) extending within a single photonic die 112 and/or across multiple photonic dies 112, as shown in FIG. 3. Further, within this area, each photonic die 112 can include a number of guided-mode resonance components (e.g., grating couplers), which will be shown in further detail below. According to various embodiments, the waveguides 304 of each photonic die 112 can include an input waveguide, a number of intermediate waveguides, and an output waveguide. In the present example of FIG. 3, the input waveguide may be disposed as a bottommost one of the waveguides and the output waveguide may be disposed as a topmost one of the waveguides, with the intermediate waveguides interposed therebetween. Further, at least each of the intermediate waveguides is formed in a diamond-shaped profile, with no straight portion interposed between two tapered portion connected back-to-back.

The electrical die 110 is coupled (e.g., bonded) to a topmost one of the stacked photonic dies 112, in the present example. However, it should be appreciated that the electrical die 110 and photonic die 112 can be bonded in various other arrangements, while remaining within the scope of present disclosure. The site 102 further includes a number of (first) conductive connectors 312, and number of (second) conductive connectors 314. The first conductive connectors 312 can electrically and/or physically couple various dies (e.g., the stacked electrical die 110 and photonic die 112) to the package substrate 302, and the second conductive connectors 314 can electrically and/or physically couple the package substrate 302 to one or more other devices/packages.

Figure 4:
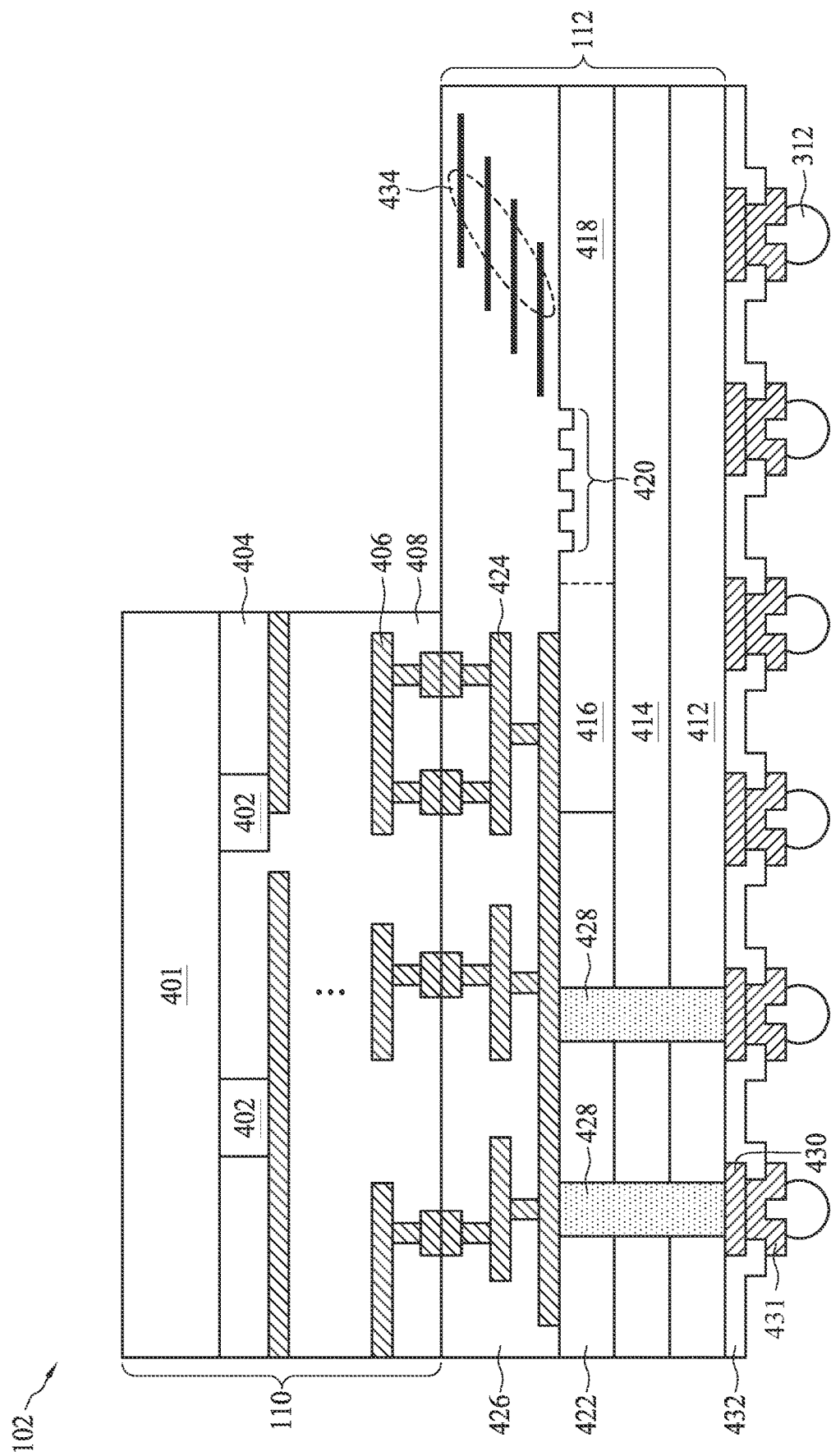
FIG. 4 illustrates a detailed, cross-sectional view of the portion of the site shown in FIG. 3, in accordance with some embodiments.

Referring next to FIG. 4 (in which one of the photonic dies 112 is shown), the electrical die 110 includes a number of device features 402 formed along the frontside surface of a substrate 401. The device features may be partially or fully overlaid by a dielectric material 404. Over the dielectric material 404 (when flipping the site 102 of FIG. 4), a number of conductive features 406 are formed in a dielectric material 408. The dielectric materials 404 and 408 may be formed of the same material or respectively different materials selected from the group consisting of: silicon oxide, silicon nitride, a low-k dielectric material, and combinations thereof. The conductive features 406 may include lines and vias, and may be formed by a damascene process, e.g., dual damascene, single damascene, or the like. The conductive features 406 may be disposed in a number of layers or levels, sometimes referred to as metallization layers. Generally, the metallization layers disposed closet to and farthest from the device features 402 may be referred to as M0 (the bottommost metallization layer) and Mx (the topmost metallization layer), respectively. Over the Mx, a number of pads (not shown) may be formed to electrically connect the conductive features 406 therein to conductive features of the photonic die 112.

The photonic die 112 may be formed on a semiconductor-on-insulator (SOI) substrate, which includes a layer of semiconductor material formed on an insulator layer. The insulator layer may be, for example, a buried oxide (BOX) layer, a silicon oxide layer, or the like. The insulator layer is provided on a semiconductor material, typically a silicon or glass substrate. As shown in FIG. 4, layers 412 and 414 may represent such underlying semiconductor material and BOX layer, respectively.

In addition, the photonic die 112 can include a number of device features 416 (e.g., photodiodes) and a number of waveguides 418 formed in the overlaying semiconductor material (not shown). The front side (or surface) of such an overlaying semiconductor material is patterned to form the waveguide 418. Patterning the overlaying semiconductor material may be accomplished with acceptable photolithography and etching techniques. In particular, openings are etched in the overlaying semiconductor material, and remaining portions of the overlaying semiconductor material can form the waveguide 418. The BOX layer 414 may act as an etch stop layer for the etching process.

The waveguide 418 can include one or more grating couplers 420 (e.g., an implementation of the above-mentioned guided-mode resonance component), which are formed in top portions of the waveguide 418. The grating coupler 420 can allow the waveguide 418 to transmit light to or receive light from the overlying light source or optical signal source. The grating coupler 420 may be formed by acceptable photolithography and etching techniques. In an embodiment, the grating coupler 420 is formed after the waveguide 418 is defined. For example, a photoresist may be formed and developed on the front side of the overlaying semiconductor material (e.g., on the waveguide 418 and in the recesses defining them). The photoresist may be patterned with openings corresponding to the grating coupler 420. One or more etching processes may be performed using the patterned photoresist as an etching mask. In particular, the front side of the overlaying semiconductor material may be etched to form recesses in the waveguide 418, thereby defining the grating coupler 420. The etching processes may be an anisotropic wet or dry etch.

The photonic die 112 further includes a dielectric material 422 formed over the device features 416 and waveguide 418. The dielectric material 422 may also be formed in the recesses defining the waveguide 418 and the grating coupler 420. The dielectric material 422 may be formed of silicon oxide, silicon nitride, a high-k dielectric material, a combination thereof, or the like, and may be formed by chemical vapor deposition (CVD), physical vapor deposition (PVD), atomic layer deposition (ALD), a spin-on-dielectric process, the like, or a combination thereof. After formation, the dielectric material 422 may be planarized, such as by a chemical mechanical polish (CMP) or a mechanical grinding, to avoid transfer of the pattern of the waveguide 418 to the dielectric material 422. In an embodiment, the dielectric material 422 is an oxide, such as silicon oxide. Due to the difference in refractive indices of the materials of the waveguide 418 and the dielectric material 422, the waveguide 418 has high internal reflections such that light is confined in the waveguide 418, depending on the wavelength of the light and the reflective indices of the respective materials. In an embodiment, the refractive index of the material of the waveguide 418 is higher than the refractive index of the material of the dielectric material 422.

Over the dielectric material 422 (as shown in FIG. 4), a number of conductive features 424 are formed in a dielectric material 426. The dielectric materials 422 and 426 may be formed of the same material or respectively different materials selected from the group consisting of: silicon oxide, silicon nitride, a high-k dielectric material, and combinations thereof. The refractive index of the material of the waveguide 418 is higher than a refractive index of the material of the dielectric material 426. The conductive features 424 may include lines and vias, and may be formed by a damascene process, e.g., dual damascene, single damascene, or the like. The conductive features 424 may be disposed in a number of layers or levels, sometimes referred to as metallization layers. Generally, the metallization layers disposed closet to and farthest from the device features 416 may be referred to as M0 (the bottommost metallization layer) and Mx (the topmost metallization layer), respectively. Over the Mx, a number of pads (not shown) may be formed to electrically connect the conductive features 424 therein to conductive features 406 of the electrical die 110, i.e., the electrical die 110 being bonded or otherwise attached to the photonic die 112.

In some embodiments, the dielectric material 426 having a certain dielectric material may be "locally" formed over the dielectric material 422. For example, in an area where there is no conductive features (e.g., 424) are formed, a first portion of the dielectric material 426, having a high-k dielectric material, can be formed in this area, while a second portion of the dielectric material 426, having a dielectric material other than the high-k dielectric material, can be formed in an area where the conductive features 424 are formed. In some embodiments, the dielectric material 426, having a common dielectric material (e.g., silicon nitride), may be "globally" formed over the dielectric material 422. As will be discussed below, the dielectric material 426 may be formed as a number of layers (or levels), each of which corresponds to one of the metallization layers having the conductive features 424, and each of which can include a number of the disclosed waveguides that has a diamond-shaped profile (when viewed from the top).

According to various embodiments of the present disclosure, the photonic die 112 further includes a number of waveguides 434 formed in the dielectric material 426, and also in the dielectric material 422 (not shown). Such waveguides can be an implementation of the waveguides 304 (FIG. 3). The waveguides 434 are vertically aligned with the waveguide 418, in some embodiments. Such waveguides 434 may be formed by patterning the dielectric material 426. For example, following the deposition of a respective layer of the dielectric material 426 (as a blanket layer), the layer can be patterned through acceptable photolithography and etching techniques to form the waveguides 434, followed by refilling another dielectric material as a spacer for the waveguides. As will be shown and discussed below, at least some of these waveguides 434 can each have a diamond-shaped profile, when viewed from the top, thereby reducing a total footprint of the waveguides 434.

In some implementations, bonding between the electrical die 110 and photonic die 112 may not include any bump structure, i.e., bumpless. However, in some other embodiments, the bonding between the electrical die 110 and photonic die 112 may be established through a number of bump structures. For example, the bonding may be hybrid bonding, fusion bonding, direct bonding, dielectric bonding, metal bonding, solder joints (e.g., microbumps), or the like.

As a non-limiting example, the electrical die 110 is bonded to the photonic die 112 by hybrid bonding. In such embodiments, covalent bonds are formed with oxide layers, such as the dielectric material 408 of the electrical die 110 and the dielectric material 426 of the photonic die 112. Before performing the bonding, a surface treatment may be performed on the electrical die 110. Next, a pre-bonding process may be performed, where respective pads or conductive features of the electrical die 110 and the photonic die 112 are aligned. The electrical die 110 and the photonic die 112 are pressed against together to form weak bonds. After the pre-bonding process, the electrical die 110 and the photonic die 112 are annealed to strengthen the weak bonds. During the annealing, OH bonds in the top of the dielectric materials break to form Si—O—Si bonds between the electrical die 110 and the photonic die 112, thereby strengthening the bonds.

The photonic die 112 further includes a number of vias 428 extending through the dielectric material 422, the BOX layer 414, and the underlying semiconductor material 412. The vias 428 may be formed by filling a number of openings that extend through the dielectric material 422, the BOX layer 414, and the underlying semiconductor material 412 with a conductive material. The conductive material is formed in the openings using, for example, ECP or electroless plating. The conductive material may be a metallic material including a metal or a metal alloy such as copper, silver, gold, tungsten, cobalt, aluminum, or alloys thereof. A planarization process, such as a CHIP or mechanical grinding may be performed to remove excess conductive material along a (e.g., backside) surface of the underlying semiconductor material 412. In various embodiments, the vias 428 can electrically couple the conductive features 424 of the photonic die 112, which are electrically coupled to the conductive features 406 of the electrical die 110, to the conductive connectors 312.

Over the backside surface of the underlying semiconductor material 412, the site 102 further includes conductive pads 430, some of which can be electrically in contact with the vias 428. The conductive pads 430 may be aluminum pads or aluminum-copper pads, although other metallic pads may be used.

A passivation film 432 may be formed over the backside surface of the underlying semiconductor material 412, covering the conductive pads 430. The passivation film 432 may be formed from a dielectric material, such as silicon oxide, silicon nitride, the like, or combinations thereof. Openings are formed through the passivation film 432 to expose (e.g., central) portions of the conductive pads 430.

Underbump metallization (UBM) 431 may be formed on the conductive pads 430 and passivation film 432. The UBM 431 may be formed by forming a blanket conductive layer on the passivation film 432 and in the openings, such as by electroplating. The conductive layer may be formed from copper, a copper alloy, silver, gold, aluminum, nickel, the like, and combinations thereof. The conductive layer may be patterned to form the UBM 431.

The conductive connectors 312 are formed on the UBM 431. The conductive connectors 312 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 312 may include a conductive material such as solder, copper, aluminum, gold, nickel, silver, palladium, tin, the like, or a combination thereof. In some embodiments, the conductive connectors 312 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 312 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed over the conductive connectors 312. The metal cap layer may include nickel, tin, tin-lead, gold, silver, palladium, indium, nickel-palladium-gold, nickel-gold, the like, or a combination thereof and may be formed by a plating process.

Figure 5:
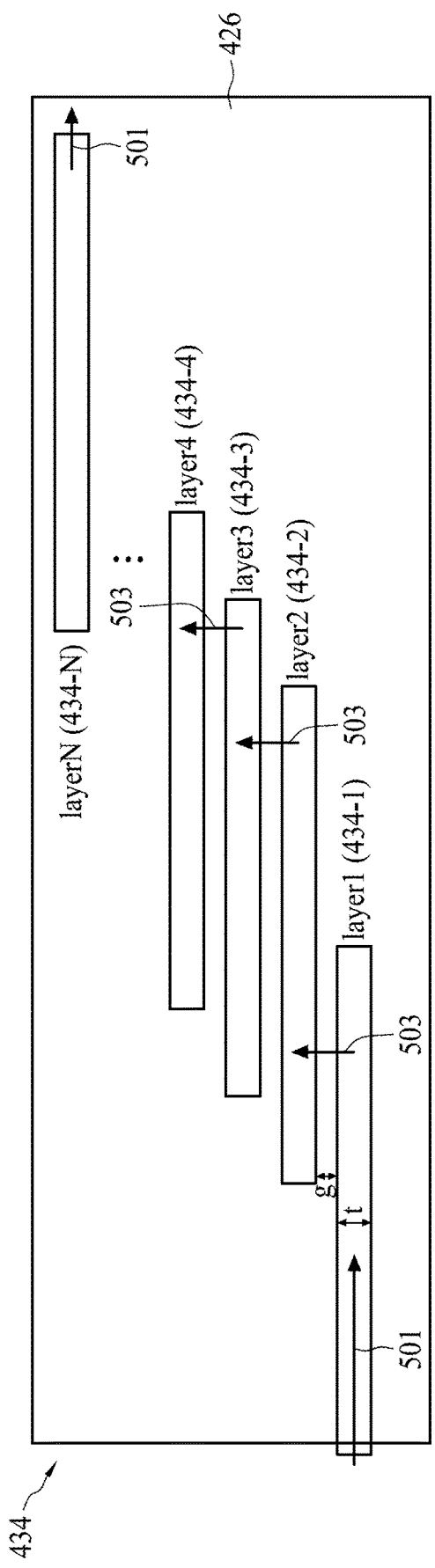
FIG. 5 illustrates a cross-sectional view of a portion of the site of FIG. 1 (e.g., photonic die), in which a number of waveguides are vertically stacked on top of one another, in accordance with some embodiments.
Figure 6:
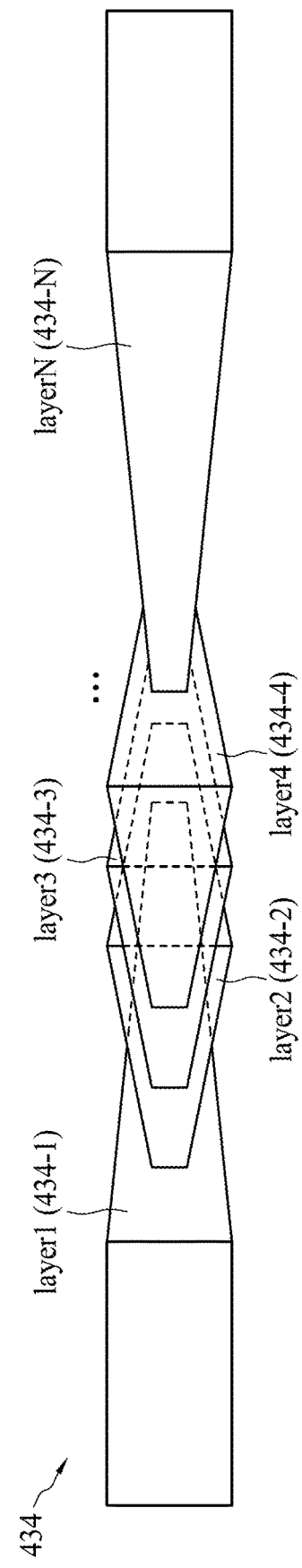
FIG. 6 illustrates a corresponding top view of the waveguides of FIG. 5, at least some of which are formed with diamond-shaped profiles, in accordance with some embodiments.

FIG. 5 illustrates a cross-sectional view of at least some of the waveguides 434 (FIG. 4), and FIG. 6 illustrates a corresponding top view of these waveguides 434, in accordance with various embodiments. The waveguides 434 shown in FIGS. 5-6 are provided for illustration purposes, and thus, it should be appreciated that each of the photonic dies 112, as disclosed herein, can include any number (e.g., from 1 to about 1000) of the waveguides 434 stacked in any of various other arrangements, while remaining within the scope of present disclosure.

As shown in FIG. 5, the waveguides 434 are vertically stacked on top of one another. Specifically, the waveguides 434 are disposed in respective different layers of the dielectric material. For example, the waveguides 434 include a first one (434-1) disposed in layer 1, a second one (434-2) disposed in layer 2, a third one (434-3) disposed in layer 3, a fourth one (434-4) disposed in layer 4 . . . and an $n^{th}$ (434-N) one disposed in layer N. Further, the waveguides 434 each have a certain portion laterally overlapped with respective portions of the neighboring waveguides 434. Alternatively stated, the neighboring waveguides 434 may be laterally shifted from each another (also shown in FIG. 6), with an offset distance. Such an offset distance can be adjusted to optimize performance of the waveguides 434, which will be discussed in further detail below.

In various embodiments, the waveguide 434-1, disposed in the bottommost layer (e.g., of a single photonic die), may be referred to as an input waveguide, and the waveguide 434-N, disposed in the topmost layer (e.g., of the same single photonic die), may be referred to as an output waveguide, where the rest of the waveguides (e.g., 434-2, 434-3, 434-4, etc.), interposed between the input and output waveguides, may sometimes be referred to as intermediate waveguides. In some embodiments, the waveguides 434 may have the same thickness or respectively different thicknesses (t), and adjacent waveguides may be vertically spaced apart with a vertical distance (g). As a non-limiting example, t is in the range from about 1 nanometer (nm) to about 10 micrometer (μm), and g is in the range from 0 nm to about 10 μm. The input waveguide 434-1 can receive an input optical signal 501 (e.g., from a fiber through a grating coupler) and transmit (or otherwise optically couple) the optical signal 501 to the upper waveguides via optical paths 503. For example, such an optical coupling may include adiabatic light transition, in which light energy is transitioned between different layers of waveguides. The output waveguide 434-N, upon receiving the optical signal 501 transmitted from the lower waveguides, can output the optical signal 501 (e.g., to a photonic device).

Referring next to the top view of FIG. 6, each of the intermediate waveguides (e.g., 434-2, 434-3, 434-4 etc.) has a diamond-shaped profile, and each of the input/output waveguides (e.g., 434-1 and 434-N) has an input/output tapered portion overlapped at least with one neighboring intermediate waveguide, in accordance with various embodiments. To further illustrate the profiles of the waveguides 434 and the arrangements of these waveguides 434, a laterally exploded (or separated) view based on the top view of FIG. 6 is depicted in FIG. 7.

Figure 7:
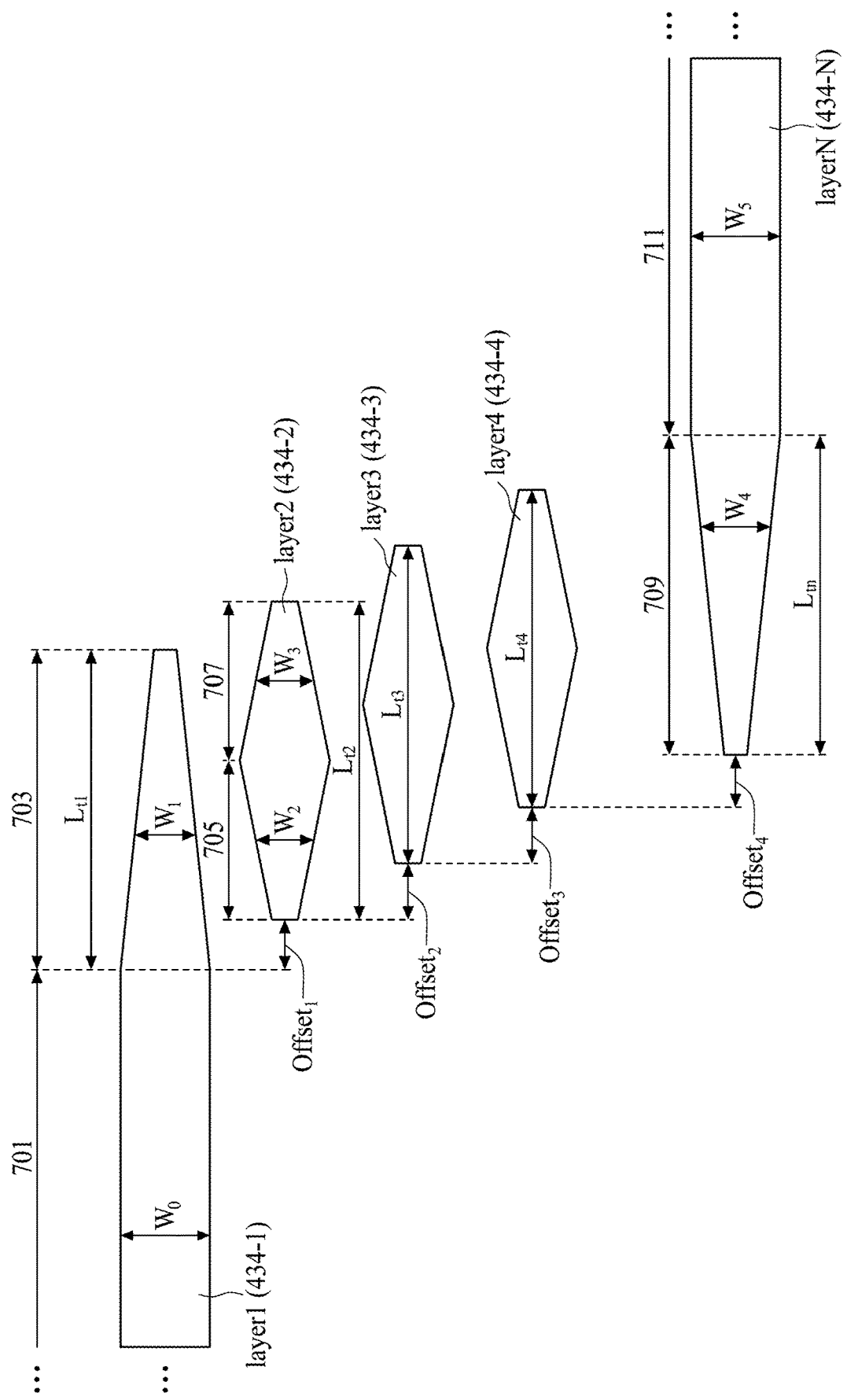
FIG. 7 illustrates a top view of the waveguides of FIG. 6, each of which is laterally separated from another, in accordance with some embodiments.

For example in FIG. 7, the input waveguide 434-1 has a straight portion 701 and a tapered portion 703. The straight portion 701 may laterally extend over a certain length and have a fixed width ($W_0$) prior to connecting to the tapered portion 703. The tapered portion 703 may laterally extend over a length ($L_{t1}$) and have a decreasing width ($W_1$). In some embodiments, the width $W_1$ may monotonically decrease from a connection point between the portions 701 and 703 (i.e., the fixed width $W_0$) to an end of the input waveguide 434-1.

In the next upper layer (level), the intermediate waveguide 434-2 has a diamond-shaped profile, with a first tapered portion 705 and second tapered portion 707 back-to-back connected to each other. Specifically, the first and second tapered portions, 705 and 707, may collectively extend over a lateral length ($L_{t2}$). The first tapered portion 705 has a monotonically increasing width ($W_2$) from a first end of the intermediate waveguide 434-2 to a connecting portion of the first and second tapered portions 705 and 707, and the second tapered portion 707 has a monotonically decreasing width ($W_3$) from the connecting portion of the first and second tapered portions 705 and 707 to a second end of the intermediate waveguide 434-2. In some embodiments, each of the first and second tapered portions, 705 and 707, may have two pairs of tilted edges, in which any of the tilted edges can form an obtuse angle with a connected end (or edge). The intermediate waveguide 434-2 (while having a certain portion vertically disposed over the input waveguide 434-1) may be laterally shifted from the input waveguide 434-1 with a lateral distance (Offset). Such an offset (Offset) may be defined as a distance laterally between the connection point (of the portions 701 and 703) of the input waveguide 434-1 and the first end of the intermediate waveguide 434-2, in some embodiments.

Other intermediate waveguides may have similar profiles and arrangements to the waveguide 434-2, and the output waveguide 434-N may have similar profiles and arrangements to the input waveguide 434-1. For example, the intermediate waveguide 434-3 has a first tapered portion and second tapered portion, which may collectively extend over a lateral length ($L_{t3}$). The first tapered portion also has a monotonically increasing width from a first end of the intermediate waveguide 434-3 to a connecting portion of the first and second tapered portions, and the second tapered portion has a monotonically decreasing width from the connecting portion of the first and second tapered portions to a second end of the intermediate waveguide 434-3. The intermediate waveguide 434-3 (while having a certain portion vertically disposed over the intermediate waveguide 434-2) may be laterally shifted from the intermediate waveguide 434-2 with a lateral distance (Offset$_2$). Such an offset (Offset$_2$) may be defined as a distance laterally between the respective first ends of the intermediate waveguides 434-2 and 434-3, in some embodiments.

In another example, the intermediate waveguide 434-4 has a first tapered portion and second tapered portion, which may collectively extend over a lateral length ($L_{t4}$). The first tapered portion also has a monotonically increasing width from a first end of the intermediate waveguide 434-4 to a connecting portion of the first and second tapered portions, and the second tapered portion has a monotonically decreasing width from the connecting portion of the first and second tapered portions to a second end of the intermediate waveguide 434-4. The intermediate waveguide 434-4 (while having a certain portion vertically disposed over the intermediate waveguide 434-3) may be laterally shifted from the intermediate waveguide 434-3 with a lateral distance (Offset$_3$). Such an offset (Offset$_3$) may be defined as a distance laterally between the respective first ends of the intermediate waveguides 434-3 and 434-4, in some embodiments.

In yet another example, the output waveguide 434-N has a tapered portion 709 and a straight portion 711. The tapered portion 709 may laterally extend over a length ($L_{tn}$) and have an increasing width ($W_4$) prior to connecting to the straight portion 711. The straight portion 711 may laterally extend over a certain length and have a fixed width ($W_5$). In some embodiments, the width $W_4$ may monotonically increase from an end of the output waveguide 434-N to a connection point between the portions 709 and 711 (i.e., the fixed width $W_5$). One of the intermediate waveguides disposed immediately lower than the output waveguide 434-N (while having a certain portion vertically overlaid by the output waveguide 434-N) may be laterally shifted from the output waveguide 434-N with a lateral distance (Offset$_4$). Such an offset (Offset$_4$) may be defined as a distance laterally between respective first ends of the next lower (intermediate) waveguide and the output waveguide 434-N, in some embodiments.

Figure 8:
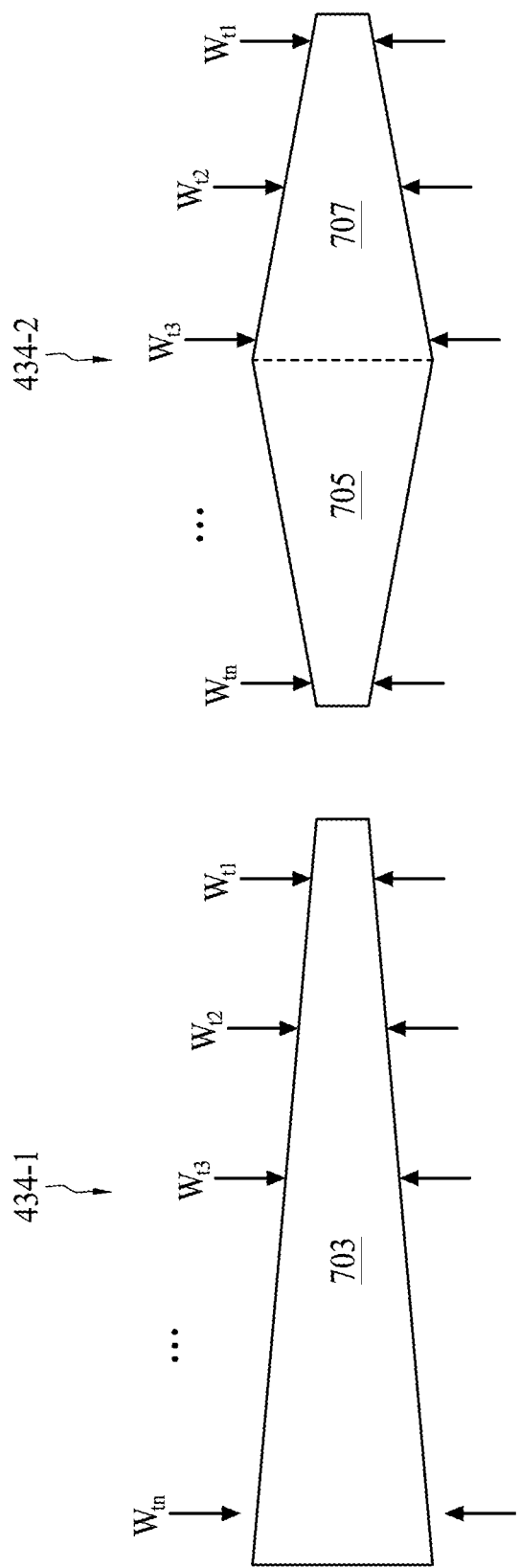
FIG. 8 illustrates a top view of two adjacent ones of the waveguides of FIG. 7, in accordance with some embodiments.

In various embodiments, the neighboring one of the waveguides 434 may be laterally arranged in a certain configuration, thereby allowing respective modes of optical signals propagated in these neighboring waveguides to spatially match in order to obtain a desired amount of efficient optical coupling. For example in FIG. 8 (where the tapered portion 703 of the input waveguide 434-1 and the first and second tapered portions 705-707 of the intermediate waveguide 434-2 are shown), the tapered portion 703 has a number of sampling points, $W_{tm} \ldots W_{t3}$, $W_{t2}$, and $W_{t1}$, and the first and second tapered portions 705-707 collectively have a number of sampling points, $W_{tm} \ldots W_{t3}$, $W_{t2}$, and $W_{t1}$. Further, the widths at respective sampling points (e.g., $W_{t2}$ of the input waveguide 434-1 and $W_{t2}$ of the intermediate waveguide 434-2) may be configured to be matched (e.g., approximately the same) to each other. In some embodiments, the number of such "matched" sampling points for each of the waveguides 434 may be between about 10 and about 12.

In various embodiments, the offsets may each be configured with a non-zero value to achieve the spatially matched modes, while not overly expanding the footprint of the waveguides 434. Generally, with a presence of the non-zero offset, the transmission portion (e.g., the portion having a decreasing width) of a first (e.g., lower) waveguide can be better aligned with the reception portion (e.g., the portion having an increasing width) of a second (e.g., upper) waveguide. In some implementations, each of the offsets between adjacent intermediate waveguides (e.g., Offset$_2$, Offset$_3$) may be configured with a range greater than zero and less than one half of the length of a corresponding overlaid intermediate waveguide. For example, Offset$_2$ between the intermediate waveguides 434-2 and 434-3 is greater than 0 and less than $\frac{1}{2} \times L_{t2}$; and Offset$_3$ between the intermediate waveguides 434-3 and 434-4 is greater than 0 and less than $\frac{1}{2} \times L_{t3}$. In some implementations, each of the offsets between adjacent intermediate waveguide and input/output waveguide (e.g., Offset$_1$, Offset$_4$) may be configured with a range greater than zero and less than one half of the length of the tapered portion of the corresponding input/output waveguide. For example, Offset$_1$ between the input waveguide 434-1 and the intermediate waveguide 434-2 is greater than 0 and less than $\frac{1}{2} \times L_{t1}$; and Offset$_4$ between the output waveguide 434-N and the adjacent (overlaid) intermediate waveguide is greater than 0 and less than $\frac{1}{2} \times L_{tm}$.

In some embodiments, each of the varying widths (e.g., $W_1$, $W_2$, $W_3$, $W_4$) can be in the range from about 1 nm to about 10 μm, depending on a wavelength of the optical signal propagated therein. As a non-limiting example, for a single mode of the optical signal in the wavelength of 1310 nm or 1550 nm, the width can vary from about 0.5 μm to about 1.5 μm. In some embodiments, each of the lengths (e.g., $L_{t1}$, $L_{t2}$, $L_{t3}$, $L_{t4}$, $L_{tm}$) can be in the range from about 1 μm to about 1 centimeters (cm).

In some other embodiments, each of the waveguides 434 can have any of other various profiles, as long as the neighboring waveguides respectively have a desired number of modes matched to each other. For example, the transmission portion (e.g., the portion having a decreasing width) of a first (e.g., lower) waveguide is aligned with the reception portion (e.g., the portion having an increasing width) of a second (e.g., upper) waveguide. FIGS. 9 and 10 illustrate other profiles of two neighboring waveguides 434 (e.g., 434-1 and 434-2). In FIG. 9, the waveguide 434-1 has a transmission portion having a curvature-based profile (with a decreasing width), and the waveguide 434-2 has a reception portion having the similar curvature-based profile (with an increasing width) aligned with the transmission portion of the waveguide 434-1. Further, the waveguide 434-2 has a transmission portion having the similar curvature-based profile (with a decreasing width) aligned with the transmission portion of a next upper or lower waveguide. In FIG. 10, the waveguide 434-1 has a transmission portion having an irregular profile (with a decreasing width), and the waveguide 434-2 has a reception portion having the similar irregular profile (with an increasing width) aligned with the transmission portion of the waveguide 434-1. Further, the waveguide 434-2 has a transmission portion having the similar irregular profile (with a decreasing width) aligned with the transmission portion of a next upper or lower waveguide.

Figure 11:
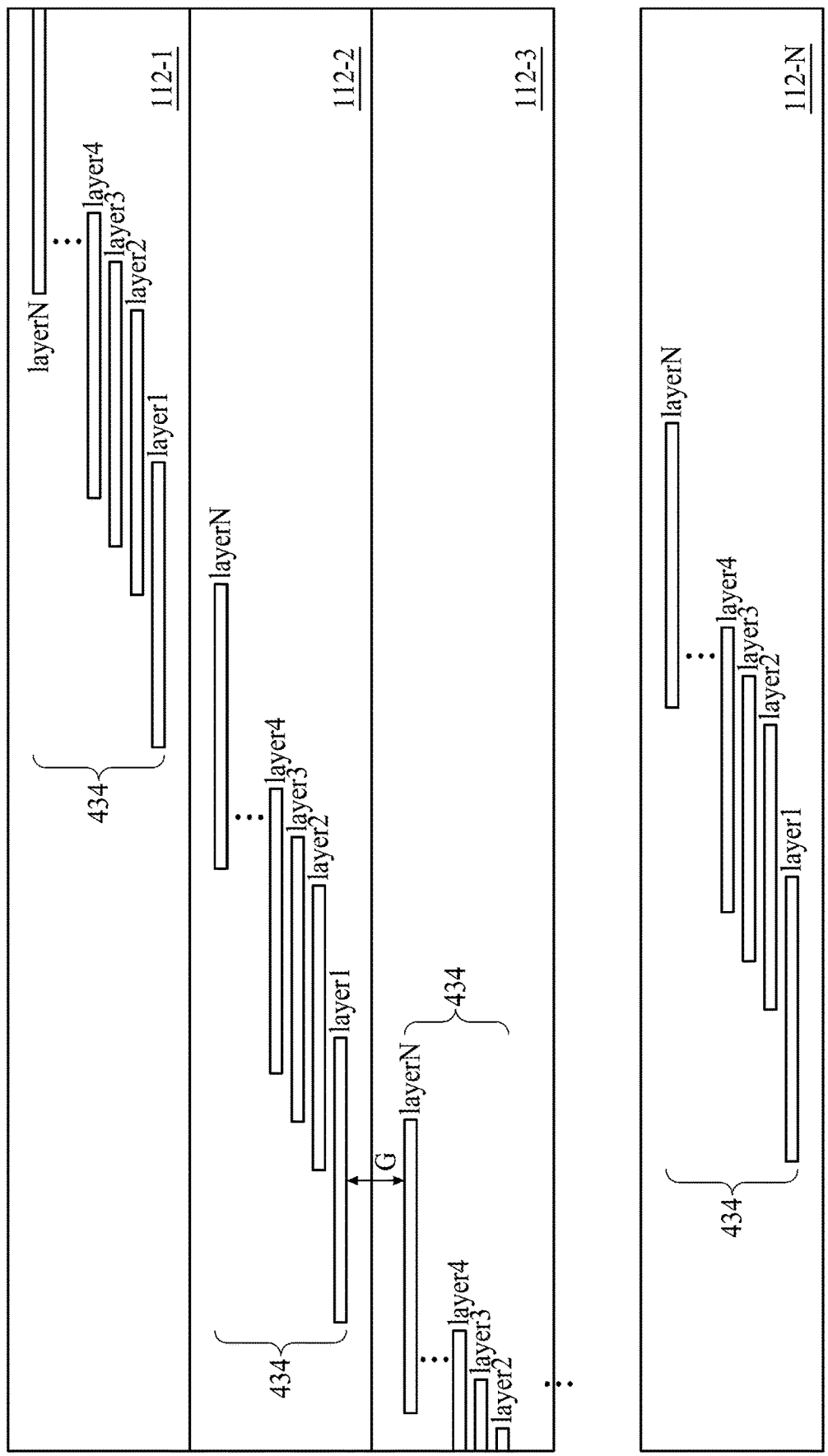
FIG. 11 illustrates a cross-sectional view of respective portions of plural sites of FIG. 1 (e.g., photonic dies), each of which has a number of waveguides vertically stacked on top of one another, in accordance with some embodiments.

FIG. 11 illustrates a cross-sectional view of respective waveguides 434 of a number of photonic dies 112-1, 112-2, 112-3 . . . 112-N stacked on top of one another, in accordance with various embodiments. It should be understood that the cross-sectional view of FIG. 11 is simplified with a number of components of each photonic die not being shown. These photonic dies 112-1 to 112-N can optically communicate with each other through their respective input and output waveguides. In some embodiments, an output waveguide of a first one of the photonic dies 112-1 to 112-N is vertically spaced from an input waveguide of a second one of the photonic dies 112-1 to 112-N with a distance (G). As a non-limiting example, G can be in the range from 0 nm to about 10 μm.

Figure 12:
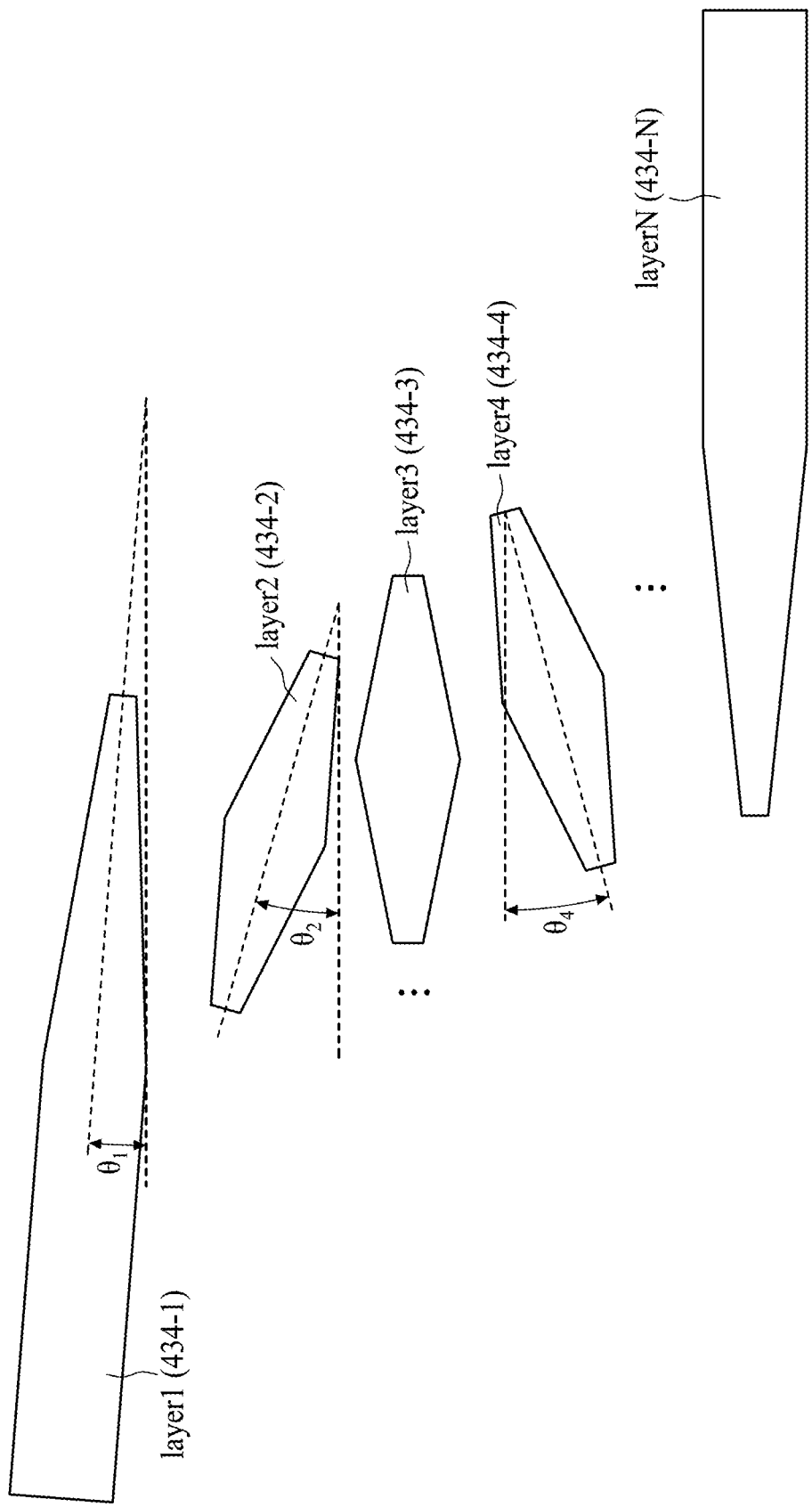
FIG. 12 illustrates a top view of the waveguides of FIG. 6, some of which are two-dimensionally rotated, in accordance with some embodiments.

FIG. 12 illustrates a top view of waveguides 434-1 to 434-N of a photonic die, some of which are two-dimensionally rotated (e.g., within the same plane) with a certain angle, in accordance with various embodiments. For example in FIG. 12, the waveguide 434-1 is clockwise rotated with an angle, $\theta_1$; the waveguide 434-2 is clockwise rotated with an angle, $\theta_2$; the waveguide 434-3 remains non-rotated; the waveguide 434-4 is counterclockwise rotated with an angle, $\theta_4$; and the waveguide 434-N remains non-rotated. As a non-limiting example, each of the rotation angles may be in the range from about 0° to about 90°.

Figure 13:
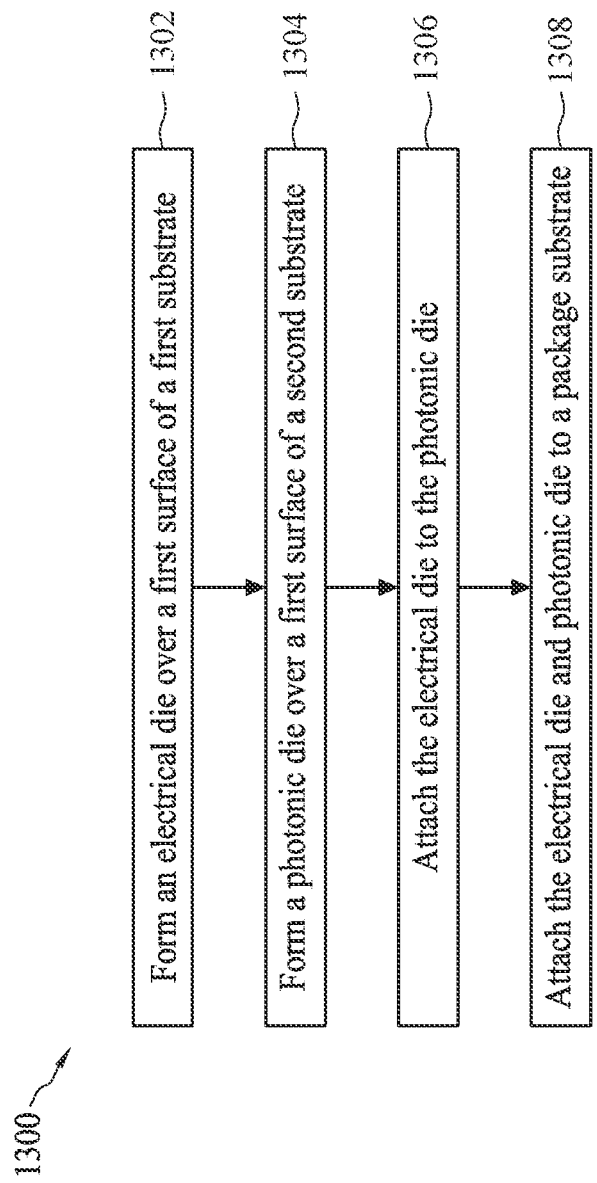
FIG. 13 illustrates an example flow chart of a method for making the portion of the site shown in FIG. 4, in accordance with some embodiments.

FIG. 13 illustrates a flow chart of an example method 1300 for forming at least a portion of a semiconductor package, in accordance with some embodiments. It should be noted that the method 1300 is merely an example, and is not intended to limit the present disclosure. Accordingly, it is understood that the order of operation of the method 1300 of FIG. 13 can change, that additional operations may be provided before, during, and after the method 1300 of FIG. 13, and that some other operations may only be described briefly herein.

Such a semiconductor package, made by the method 1300, may include at least an electrical die and a photonic die operatively and physically coupled to each other. For example, the semiconductor package may include a portion of the site 102, as discussed above with respect to FIGS. 1-4. Accordingly, operations of the method 1300 will be discussed in conjunction with the components discussed with respect to FIGS. 1-4.

The method 1300 starts with operation 1302 of forming an electrical die over a first surface (side) of a first substrate. For example, an electrical die (e.g., 110), including a number of electrical device features (e.g., 402) and conductive features (e.g., 406), may be formed over the frontside surface of a first substrate (e.g., 401). Further, the electrical die 110 may be laterally arranged in a region where waveguides of a coupled photonic die (e.g., 112) is not configured to be formed.

Next, the method 1300 proceeds to operation 1304 of forming a photonic die over a first surface of a second substrate. Prior to, concurrently with, or subsequently to forming the electrical die 110 on the substrate 401, a photonic die (e.g., 112) is formed over the frontside surface of a second substrate (e.g., an SOI including the underlying semiconductor material 412, BOX 414, and an overlaying semiconductor material). In some embodiments, the photonic die 112 includes a number of optical device features (e.g., 416), a number of waveguides (e.g., 418) with at least a grating coupler (e.g., 420), a number of conductive features (e.g., 424), and a number of vertically stacked waveguides (e.g., 434). In some embodiments, the conductive features 424 and the waveguides 434 may be formed in respectively different regions of the second substrate (SOI).

Next, the method 1300 proceeds to operation 1306 of attaching the electrical die to the photonic die. Continuing with the same example, upon forming the photonic die 112 and the electrical die 110, the two dies may attach to each other through various bonding techniques such as, for example, hybrid bonding, fusion bonding, direct bonding, dielectric bonding, metal bonding, solder joints (e.g., microbumps), or the like. In some embodiments, the electrical die 110 may be bonded to the photonic die 112, with the conductive features 406 (of the electrical die 110) facing the conductive features 424 (of the photonic die 112). Stated another way, the electrical die 110 can be bonded to the photonic die 112, with their respective frontside surfaces facing each other.

Next, the method 1300 proceeds to operation 1308 of attaching the electrical die and photonic die to a package substrate. Upon bonding the photonic die 112 and the electrical die 110 to each other, such bonded dies may be attached to a package substrate (e.g., 302). In some embodiments, the bonded photonic die 112 and electrical die 110 may be attached to the package substrate 302 via a number of bump structures (e.g., 312). Further, the bump structures 312 may be formed on a backside (opposite) surface of the substrate where the photonic die 112 is formed.

In one aspect of the present disclosure, a semiconductor device is disclosed. The semiconductor device includes a plurality of intermediate waveguides. The plurality of intermediate waveguides are vertically disposed on top of one another, and vertically adjacent ones of the plurality of intermediate waveguides are laterally offset from each other. When viewed from the top, each of the plurality of intermediate waveguides essentially consists of a first portion and a second portion, the first portion has a first varying width that increases from a first end of the corresponding intermediate waveguide to a middle of the corresponding intermediate waveguide, and the second portion has a second varying width that decreases from the middle of the corresponding intermediate waveguide to a second end of the corresponding intermediate waveguide.

In another aspect of the present disclosure, a semiconductor package is disclosed. The semiconductor package includes a first photonic die, and a second photonic die vertically stacked over the first photonic die. Each of the first photonic die and the second photonic die includes a plurality of intermediate waveguides vertically disposed between an input waveguide and an output waveguide. The plurality of intermediate waveguides are vertically disposed on top of one another, and vertically adjacent ones of the plurality of intermediate waveguides are laterally offset from each other. When viewed from the top, each of the plurality of intermediate waveguides comprises a plurality of edges tilted from its lengthwise direction, at least a first pair of tilted edges connected to each other, and at least a second pair of tilted edges connected to each other.

In yet another aspect of the present disclosure, a method for fabricating semiconductor devices is disclosed. The method includes providing a silicon-on-insulator (SOI) substrate. The method includes forming a plurality of optical device features along a major surface of the SOI substrate. The method includes forming a plurality of waveguides over the optical device features. The plurality of waveguides are disposed in different levels, respectively, and vertically adjacent ones of the plurality of waveguides are laterally offset from each other. When viewed from the top, each of the plurality of waveguides essentially consists of a first portion and a second portion, the first portion has a first varying width that increases from a first end of the corresponding waveguide to a middle of the corresponding waveguide, and the second portion has a second varying width that decreases from the middle of the corresponding waveguide to a second end of the corresponding waveguide.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   a plurality of intermediate waveguides;
   wherein the plurality of intermediate waveguides are vertically disposed on top of one another, and vertically adjacent ones of the plurality of intermediate waveguides are laterally offset from each other; and
   wherein, when viewed from the top, each of the plurality of intermediate waveguides essentially consists of a first portion and a second portion, the first portion has a first varying width that increases from a first end of the corresponding intermediate waveguide to a middle of the corresponding intermediate waveguide, and the second portion has a second varying width that decreases from the middle of the corresponding intermediate waveguide to a second end of the corresponding intermediate waveguide.

2. The semiconductor device of claim 1, further comprising:
   an input waveguide vertically disposed below the plurality of intermediate waveguides; and
   an output waveguide vertically disposed above the plurality of intermediate waveguides.

3. The semiconductor device of claim 2, wherein the input waveguide is laterally offset from a bottommost one of the plurality of intermediate waveguides, and the output waveguide is laterally offset from a topmost one of the plurality of intermediate waveguides.

4. The semiconductor device of claim 3, wherein the input waveguide comprises an input tapered portion overlapping at least one of the first or second portion of the bottommost intermediate waveguide, and the output waveguide comprises an output tapered portion overlapping at least one of the first or second portion of the topmost intermediate waveguide.

5. The semiconductor device of claim 4, wherein the input tapered portion has a third varying width that monotonically decreases from a first fixed width, and the output tapered portion has a fourth varying width that monotonically increases to a second fixed width.

6. The semiconductor device of claim 1, wherein the first portion monotonically increases to a fixed width.

7. The semiconductor device of claim 1, wherein the first portion and second portion are back-to-back connected to each other, with no transitioning portion disposed therebetween.

8. The semiconductor device of claim 1, wherein the second portion monotonically decreases from a fixed width.

9. The semiconductor device of claim 1, wherein the vertically adjacent intermediate waveguides are laterally offset from each other with a distance that is greater than zero and less than one half of a length of the intermediate waveguides.

10. The semiconductor device of claim 1, further comprising a dielectric material interposed between the vertically adjacent intermediate waveguides, wherein the dielectric material includes a high-k dielectric material.

11. A semiconductor package, comprising:
a first photonic die; and
a second photonic die vertically stacked over the first photonic die;
wherein each of the first photonic die and the second photonic die comprises:
a plurality of intermediate waveguides vertically disposed between an input waveguide and an output waveguide;
wherein the plurality of intermediate waveguides are vertically disposed on top of one another, and vertically adjacent ones of the plurality of intermediate waveguides are laterally offset from each other; and
wherein, when viewed from the top, each of the plurality of intermediate waveguides comprises a plurality of edges tilted from its lengthwise direction, at least a first pair of tilted edges connected to each other, and at least a second pair of tilted edges connected to each other.

12. The semiconductor package of claim 11, wherein the first pair of tilted edges form a first obtuse angle, and the second pair of tilted edges form a second obtuse angle.

13. The semiconductor package of claim 11, wherein the vertically adjacent intermediate waveguides have their respective portions overlapped with each other to have optical coupling.

14. The semiconductor package of claim 11, wherein the vertically adjacent intermediate waveguides are laterally offset from each other with a distance that is greater than zero and less than one half of a length of the intermediate waveguides along the lengthwise direction.

15. The semiconductor package of claim 11, wherein the output waveguide of the first photonic die is in optical coupling with the input waveguide of the second photonic die.

16. The semiconductor package of claim 11, wherein each of the first photonic die and second photonic die is in electrical coupling with a respective electrical die.

17. The semiconductor package of claim 11, wherein each of the first photonic die and the second photonic die comprises a dielectric material interposed between the vertically adjacent intermediate waveguides.

18. The semiconductor package of claim 17, wherein the dielectric material includes a high-k dielectric material.

19. A method for fabricating semiconductor devices, comprising:
providing a silicon-on-insulator (SOI) substrate;
forming a plurality of optical device features along a major surface of the SOI substrate; and
forming a plurality of waveguides over the optical device features;
wherein the plurality of waveguides are disposed in different levels, respectively, and vertically adjacent ones of the plurality of waveguides are laterally offset from each other; and
wherein, when viewed from the top, each of the plurality of waveguides essentially consists of a first portion and a second portion, the first portion has a first varying width that increases from a first end of the corresponding waveguide to a middle of the corresponding waveguide, and the second portion has a second varying width that decreases from the middle of the corresponding waveguide to a second end of the corresponding waveguide.

20. The method of claim 19, wherein the vertically adjacent intermediate waveguides have their respective portions overlapped with each other to have optical coupling.

* * * * *